US008453052B1

(12) United States Patent
Newman et al.

(10) Patent No.: US 8,453,052 B1
(45) Date of Patent: May 28, 2013

(54) REAL-TIME DOCUMENT SHARING AND EDITING

(75) Inventors: Steve Newman, Portola Way, CA (US); Sam Schillace, Portola Valley, CA (US); Claudia Carpenter, Redwood City, CA (US)

(73) Assignee: Google Inc., Mountain View, CA (US)

( * ) Notice: Subject to any disclaimer, the term of this patent is extended or adjusted under 35 U.S.C. 154(b) by 1605 days.

(21) Appl. No.: 11/506,181

(22) Filed: Aug. 16, 2006

(51) Int. Cl.
*G06F 17/21* (2006.01)

(52) U.S. Cl.
USPC ......................................................... 715/255

(58) Field of Classification Search
USPC .................................. 715/273, 277, 751, 255
See application file for complete search history.

(56) References Cited

U.S. PATENT DOCUMENTS

| | | | | | |
|---|---|---|---|---|---|
| 5,799,320 | A | * | 8/1998 | Klug ............................... | 707/201 |
| 6,049,334 | A | * | 4/2000 | Bates et al. .................... | 715/755 |
| 6,067,551 | A | * | 5/2000 | Brown et al. .................. | 707/203 |
| 6,073,161 | A | * | 6/2000 | DeBoskey et al. ............. | 709/200 |
| 6,411,965 | B2 | * | 6/2002 | Klug ....................................... | 1/1 |
| 6,446,093 | B2 | * | 9/2002 | Tabuchi ........................... | 707/205 |
| 6,516,339 | B1 | * | 2/2003 | Potts et al. ..................... | 709/203 |
| 6,578,054 | B1 | * | 6/2003 | Hopmann et al. ..................... | 1/1 |
| 6,694,335 | B1 | * | 2/2004 | Hopmann et al. ..................... | 1/1 |
| 6,944,642 | B1 | * | 9/2005 | Hopmann et al. ............ | 709/203 |
| 7,149,776 | B1 | * | 12/2006 | Roy et al. ....................... | 709/205 |
| 7,249,314 | B2 | * | 7/2007 | Walker et al. ................. | 715/205 |
| 8,196,029 | B1 | * | 6/2012 | Rucker et al. ................. | 715/200 |
| 2002/0065848 | A1 | * | 5/2002 | Walker et al. ................. | 707/511 |
| 2003/0088831 | A1 | * | 5/2003 | Bauer et al. ................... | 715/516 |
| 2003/0179230 | A1 | * | 9/2003 | Seidman ....................... | 345/750 |
| 2004/0085354 | A1 | * | 5/2004 | Massand ....................... | 345/751 |
| 2004/0088647 | A1 | * | 5/2004 | Miller et al. ................... | 715/500 |
| 2004/0122898 | A1 | * | 6/2004 | Srinivasa ....................... | 709/205 |
| 2004/0205542 | A1 | * | 10/2004 | Bargeron et al. ............. | 715/512 |
| 2004/0230895 | A1 | * | 11/2004 | Elza et al. ...................... | 715/511 |
| 2005/0097434 | A1 | * | 5/2005 | Storisteanu ................... | 715/500 |
| 2005/0210392 | A1 | * | 9/2005 | Koide et al. ................... | 715/751 |
| 2005/0273700 | A1 | * | 12/2005 | Champion et al. ............ | 715/512 |
| 2006/0026502 | A1 | * | 2/2006 | Dutta ............................. | 715/511 |
| 2006/0053380 | A1 | * | 3/2006 | Spataro et al. ................ | 715/753 |
| 2006/0179411 | A1 | * | 8/2006 | Wolf et al. ..................... | 715/751 |
| 2006/0200755 | A1 | * | 9/2006 | Melmon et al. ............... | 715/511 |
| 2007/0101256 | A1 | * | 5/2007 | Simonyi ........................ | 715/511 |
| 2007/0118598 | A1 | * | 5/2007 | Bedi et al. ..................... | 709/204 |

(Continued)

OTHER PUBLICATIONS

ThinkFree Online Review (web pages); Apr. 24, 2006; downloaded from http://www.extremetech.com/ on Jul. 9, 2006; 11 pages.

(Continued)

*Primary Examiner* — Frank D Mills
(74) *Attorney, Agent, or Firm* — Wolff & Samson, PC

(57) ABSTRACT

Methods, systems and apparatus, including computer program products, for real-time document sharing and editing. In one aspect, a method includes comparing a first user's and a second user's changes to a document, the document being edited by the first user and the second user concurrently; and notifying the first user of a conflicting change and content of any conflicting change to the document made by the first user but not made to the document because of the conflicting change. In another aspect, a method includes recording a saved position of a cursor of a user editing a client-side copy of a document; receiving an update to the document and generating an updated client-side copy of the document; using the saved position to determine an updated position of the cursor; and displaying to the user the updated client-side copy of the document with the cursor displayed at the updated position.

27 Claims, 6 Drawing Sheets

U.S. PATENT DOCUMENTS

| | | | | |
|---|---|---|---|---|
| 2007/0186171 A1* | 8/2007 | Junuzovic et al. | | 715/751 |
| 2007/0220417 A1* | 9/2007 | Mathew et al. | | 715/511 |
| 2007/0244906 A1* | 10/2007 | Colton et al. | | 707/10 |
| 2008/0059539 A1* | 3/2008 | Chin et al. | | 707/203 |
| 2008/0072141 A1* | 3/2008 | Hodel-Widmer | | 715/255 |

OTHER PUBLICATIONS

ThinkFree Online Review (text); Apr. 24, 2006; downloaded from http://www.extremetech.com/ on Jul. 9, 2006; 5 pages.

Geek Patrol (web pages); Jul. 7, 2004; downloaded from http://www.geekpatrol.ca/2004/07-subethaedit-201/ on Jul. 18, 2007; 4 pages.

Robin Good's Latest News (web pages); Feb. 20, 2005; downloaded from http://www.maternewmedia.org/news/2005/02/20/synchronous_collaborative_text_document_editing.htm on Jul. 18, 2007; 4 pages.

Norman G. Vinson, "Are Wikis Usable?," National Research Council of Canada, Institute for Information Technology, WikiSym '05, Oct. 16-18, 2004; 13 pages.

SoC 2006: Collaborative Editor (web pages) Aug. 14, 2006, and other dates; downloaded from http://groups.drupal.org/soc-collaborative-editor on Jul. 19 2007.

* cited by examiner

REAL-TIME DOCUMENT SHARING AND EDITING

BACKGROUND AND SUMMARY

This specification relates to electronic document processing and more particularly to the editing of a document at the same time by multiple collaborators.

Conventional techniques for sharing and editing the same document do not compare collaborators' changes until one of the collaborators tries to save the document. Conventional techniques also do not give any notice to the collaborators about a possible collision, i.e., that the collaborators' changes conflict, until one of the collaborators tries to save the document. When saving the document, even though the collaborators are informed of a data collision, they still do not know what the conflicting data is and risk losing their conflicting data.

This specification describes technologies for collaborative and concurrent editing of documents. A system that implements these technologies automatically compares collaborators' added or changed data. In some embodiments, the comparison is made at a predetermined frequency. When an edit collision occurs, the collaborators are informed of the collision and what the conflicting data or text is, so that the collaborator can reinsert the conflicting text that was not added to the document because of the collision. In some embodiments, the collaborators are provided options for copying the conflicting text and then pasting it back into the document. When no data collision occurs, the system automatically merges the collaborators' added or changed data and then shows the collaborators the updated merged document in real time.

The document is stored in an online server and accessible to authorized collaborators using a browser-based application.

Particular embodiments of the subject matter described in this specification can be implemented to realize one or more of the following advantages.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
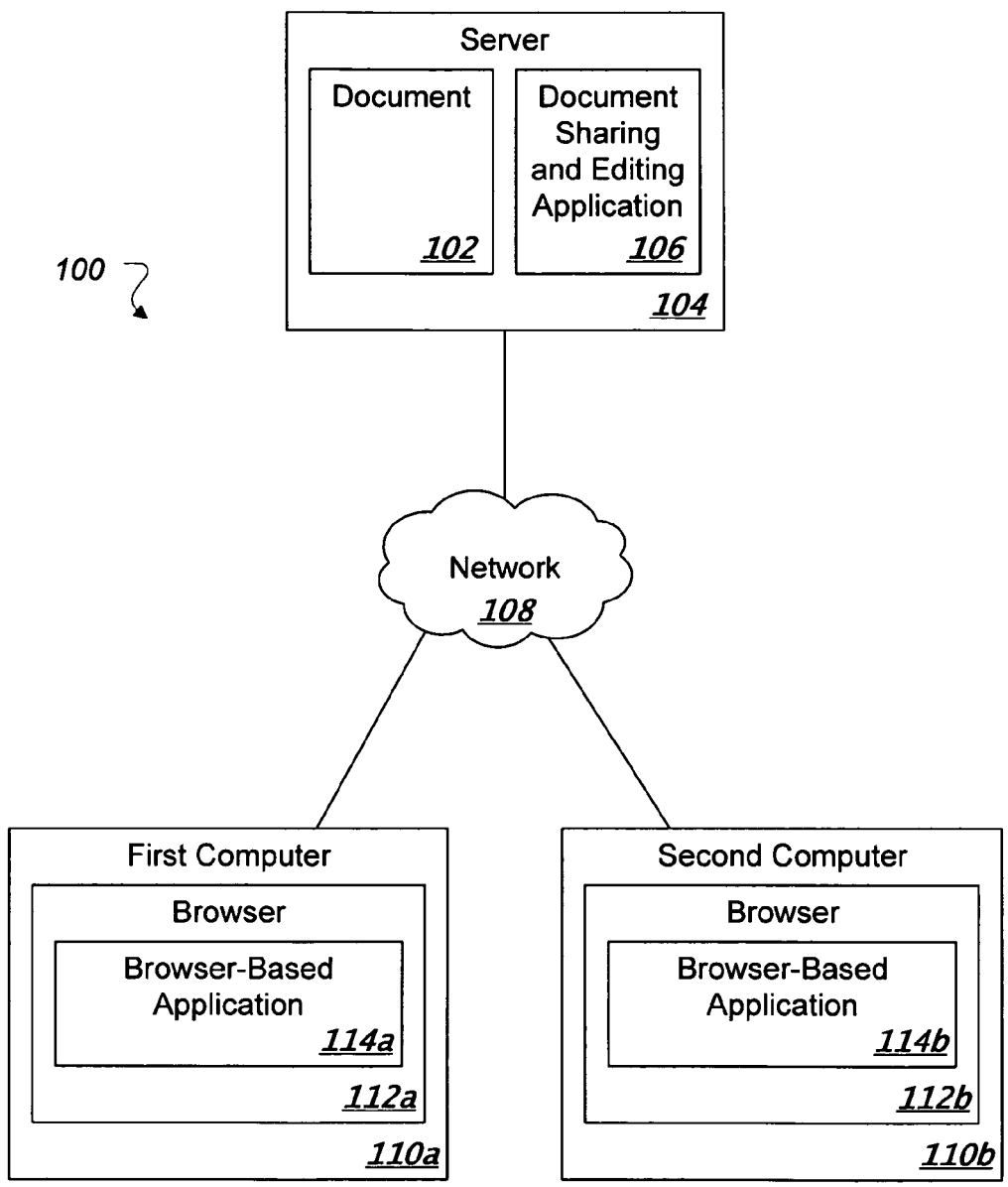
FIG. 1 is a block diagram showing an example of a system for sharing and editing a document.

FIG. 1 is a block diagram showing an example of a system 100 for sharing and editing a document 102. The document 102 is in an electronic format, such as a HyperText Markup Language (HTML) or an Extensible Markup Language (XML) format. A server 104 stores the document 102. The server 104 includes a document sharing and editing application 106. The application 106 provides access to the document 102 over a network 108, such as a local area network (LAN), a wide area network (WAN), the Internet, or some combination of them.

For example, the document sharing and editing application 106 may provide document access to a first computer 110a and a second computer 110b. The computers 110a and 110b include browsers 112a and 112b, respectively. The browsers 112a and 112b include browser-based applications 114a and 114b, respectively. The browser-based applications 114a and 114b are components within the browsers 112a and 112b, respectively, such as a plug-in, a script (e.g., JAVASCRIPT), an applet, or some combination of them. The browser-based applications 114a and 114b present the document 102 to users of the computers 110a and 110b, respectively.

The browser-based applications 114a and 114b also allow users of the computers 110a and 110b, respectively, to edit or modify the document 102. Particularly, a first user at the computer 110a and a second user at the computer 110b may edit the document 102 concurrently. In certain implementations, the browser-based applications 114a and 114b utilize the design mode of the browsers 112a and 112b, respectively, to edit the HTML code of the document 102. The document sharing and editing application 106 receives changes to the document 102 from the first user and the second user. The application 106 compares the changes to determine if any changes from the first user conflict with any changes of the second user. If a change does not conflict, then the application 106 merges the change into the document 102 and the browser-based applications 114a and 114b present the change. If a change from a user conflicts with a change from another user, then the application 106 notifies the user of the conflict and allows the user to correct the conflict.

Figure 2:
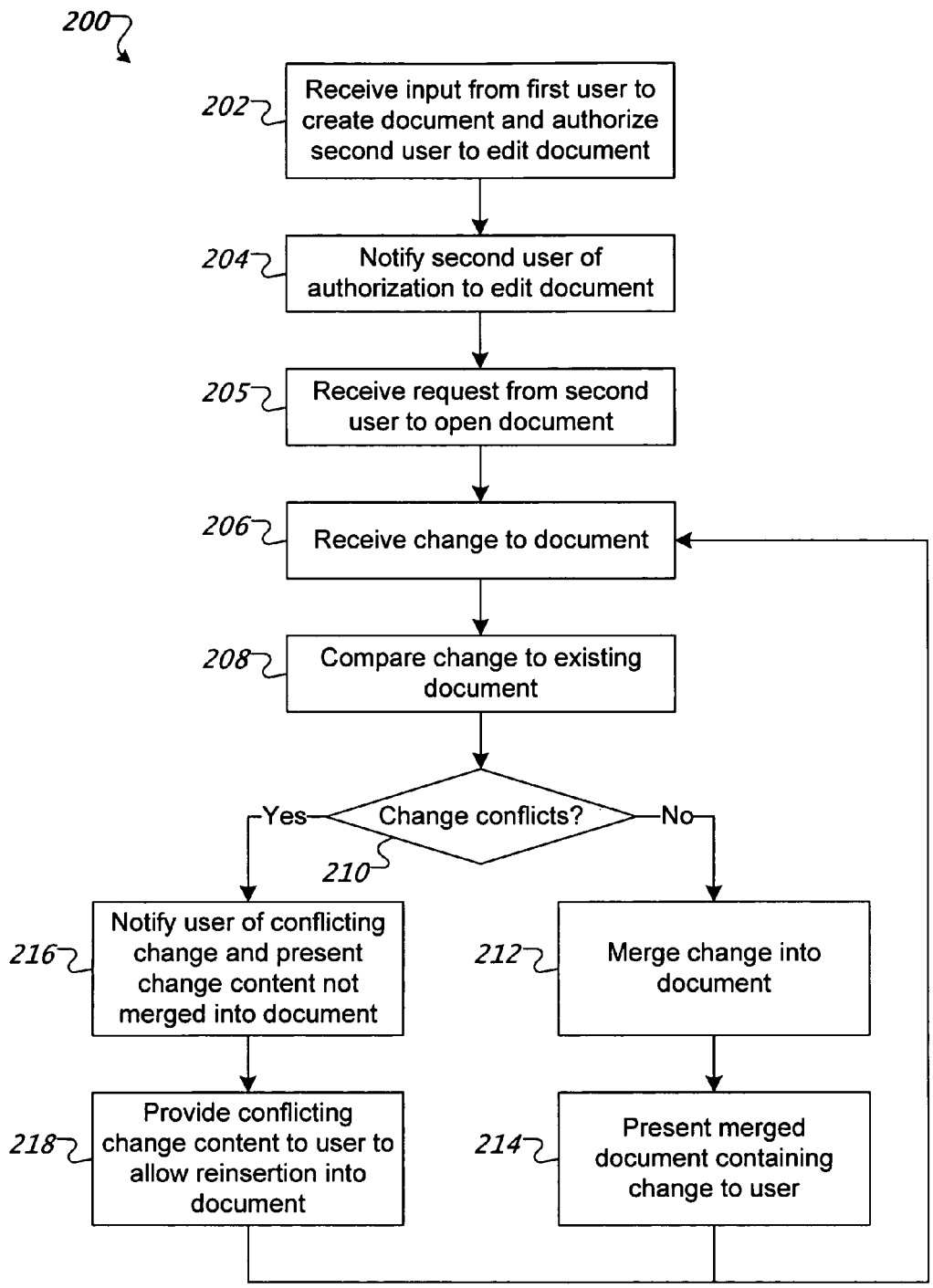
FIG. 2 is a flow chart showing an example of a process for sharing and editing a document.

FIG. 2 is a flow chart showing an example of a process 200 for sharing and editing a document. The process 200 may be performed, for example, by a system such as the system 100 and, for clarity of presentation, the description that follows uses the system 100 as the basis of an example for describing the process 200. However, another system, or combination of systems, may be used to perform the process 200.

The process 200 receives (202) an input from a first user to create a document and, at the same time or later, to authorize a second user to edit the document. For example, the first user may use the browser-based application 114a to create the document 102 and allow the second user to edit the document 102.

The process 200 notifies (204) the second user of the authorization by the first user to edit the document. For example, the second user may receive a notification, e.g., as an e-mail message or an indication in a user interface window, indicating that the first user has authorized the second user to edit the document 102.

The process 200 receives (205) a request to open the document from the second user. For example, the second user may make an input requesting that the browser-based application 114b open and present the document 102 for editing.

The process 200 receives (206) changes to the document from a user. For example, the first user may make changes to the document 102 using the browser-based application 114a. The browser-based application 114a transmits the changes to the document sharing and editing application 106. For HTML documents, the changes can be transmitted in the form of document deltas.

The process 200 compares (208) the change to other changes received since the document was last received by the user to determine if the changes conflict with one another. For example, the document sharing and editing application 106 compares the change from the first user and a change already received from the second user to determine if the changes conflict with one another. An example of a conflict is a modification of a block of text by the first user while the same text was already removed from the document 102 by the second user.

To the extent the changes do not conflict (210), the process 200 merges (212) the changes into the document and presents (214) the merged changes to the user. Where there is a change conflict, the process 200 notifies (216) the user of the conflict and presents the change content that was not merged into the document. For example, the document sharing and editing application 106 may present a message in the browser-based application 114a indicating that the changes made by the user were not merged into the document 102 due to a conflict. The message can take the form of tagged content in the merged changes sent to the user that the browser-based application presents to the user in a form that the user can copy and paste.

The process 200 thus provides (218) the user an option to retrieve and save the conflicting change to the document. For example, the notification in the browser-based application 114a indicating the conflict may include controls that allow the user to retrieve and save the conflicting change.

The process 200 may then receive (206) additional changes to the document. The changes may be made by the first user or the second user. In general, users may edit the document at client applications, such as the browser-based applications 114a and 114b, concurrently. Periodically (e.g., every 10 seconds or every 30 seconds), the users' client applications send changes to a server, such as the server 104.

In certain implementations, the client applications send changes to the server and request updates from the server without waiting for the period of time. In addition, the server may wait before sending a reply until a predetermined period of time has elapsed and/or until other changes have been received at the server. Upon receiving the reply from the server, the client application replies and waits again for another response from the server. This gives the server control over when a client application will receive updates, such as from changes made to the document by other users.

Figure 3:
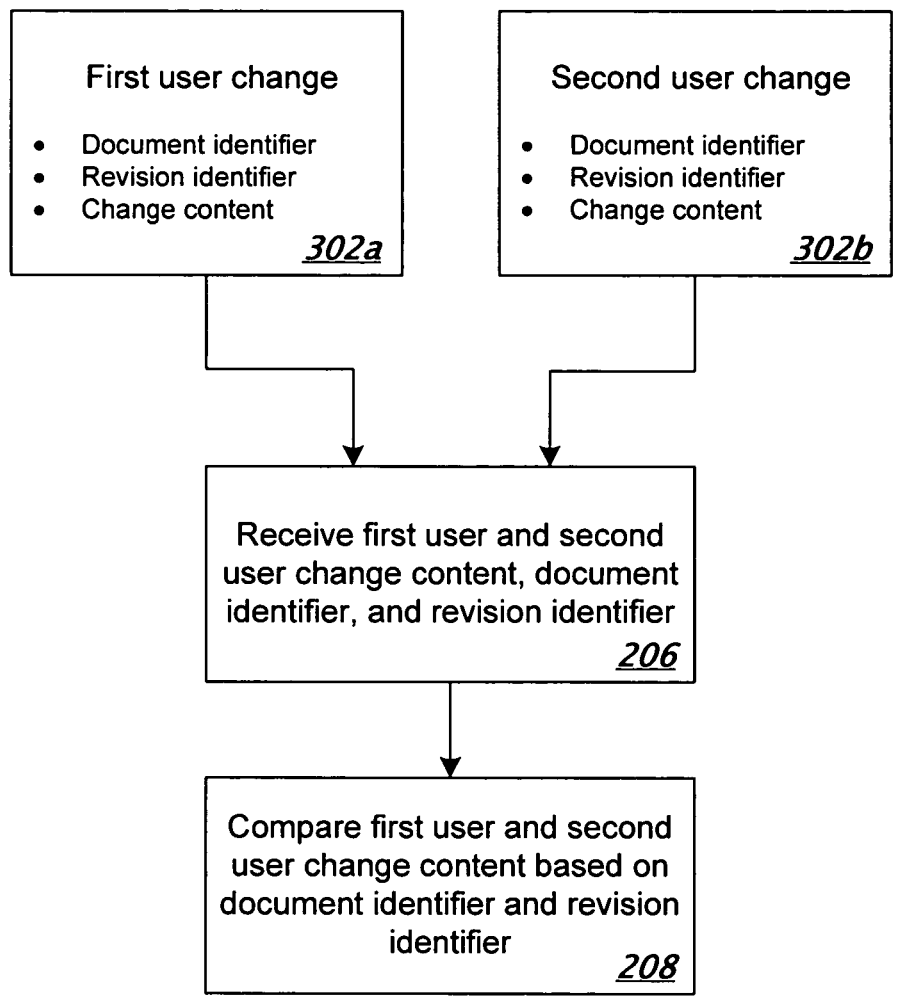
FIG. 3 is a schematic diagram illustrating operation of a system for comparing changes made to a document by two users.

FIG. 3 is a schematic diagram illustrating operation of a system for comparing changes made to the document 102 by the first user and the second user. The system receives changes 302a and 302b made to the document 102 by a first user and a second user, respectively. The changes can take the form of a markup language document. Each of the changes 302a and 302b includes a document identifier, a version identifier, and change content. The document identifier indicates that the change was made to the document 102. The version identifiers identify the version of the document 102 to which the changes 302a and 302b were made, respectively. The change content includes the actual change made to the document 102.

The document sharing and editing application 106 receives (206) the changes 302a and 302b, including the document identifiers, the version identifiers, and the change content. The application 106 compares (208) the document identifiers, the version identifiers, and the change content to determine if a change conflict exists. If the document identifiers do not match, then the changes are made to different documents and no change conflict exists. If the document identifiers match, then the version identifiers are used to determine a common previous version between the version modified by change 302a, the version modified by 302b, and the current version at the server 102. The application 106 then compares the changes between the current version and the common version with the changes between change 302a and the common version and the changes between change 302b and the common version. If the content of the changes since the common version resulting from changes 302a or 302b affects a portion of the document 102 in common with the content of the changes in the current document 102 since the common version or if the changes since the common version resulting from changes 302a and 302b affect a common portion of the documents 102, then a conflict is determined to exist.

Figure 4:
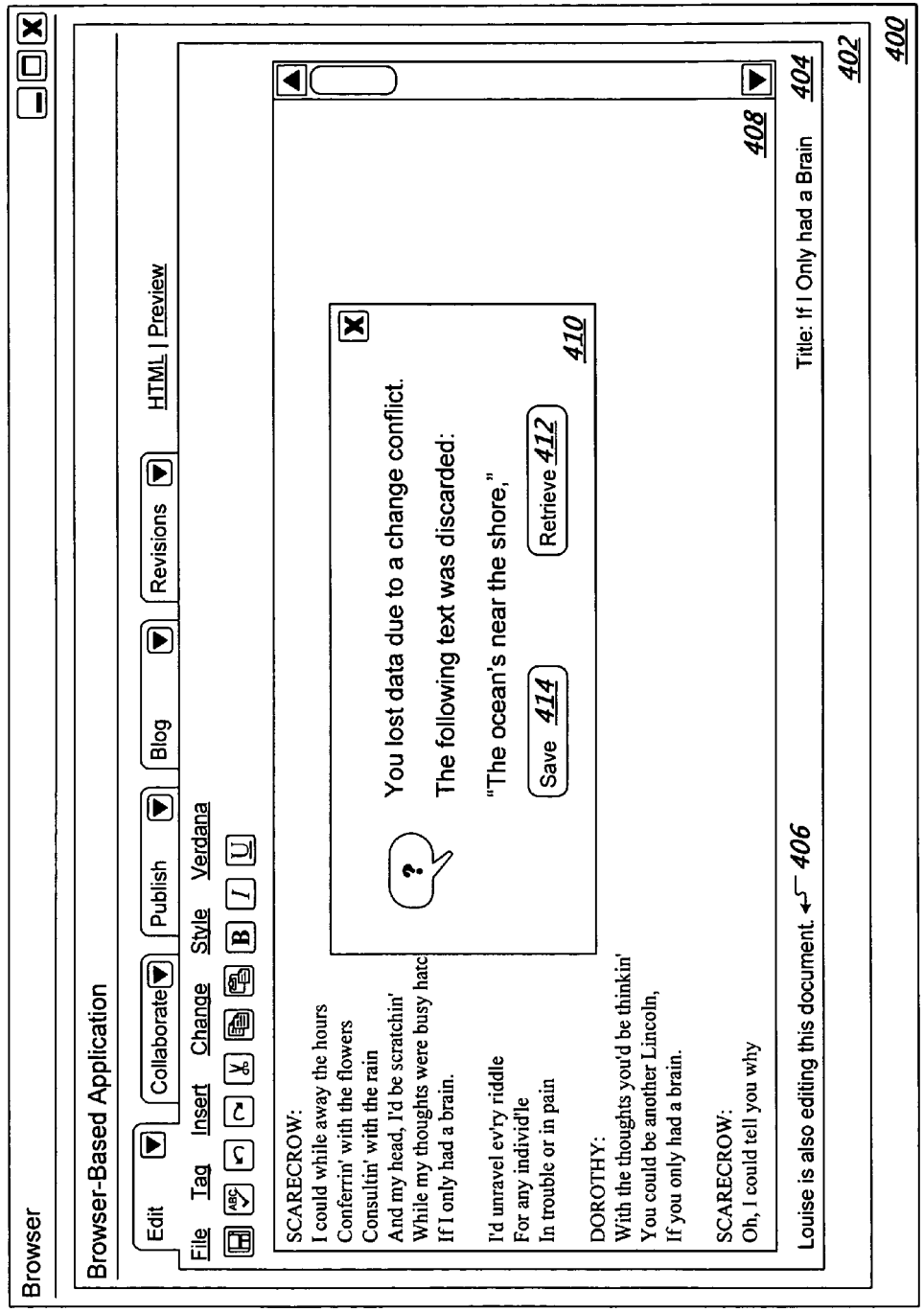
FIG. 4 is a screenshot showing an example of a user interface for sharing and editing a document.

FIG. 4 is a screenshot showing an example of a user interface 400 for sharing and editing a document. The user interface 400 is a browser, such as the browser 112a or 112b. The user interface 400 presents a browser-based application 402, such as the browser-based application 114a or 114b. The browser-based application 402 displays tabs that present the document 102 and allow a user to manage the document 102. A collaborate tab allows a user to create a document and authorize users to edit the document. For example, a user may input user identifiers, such as e-mail addresses or user names, of other users to authorize the other users to edit the document.

The browser-based application 402 as illustrated presents an edit tab 404. The edit tab 404 includes controls for editing the document 102 and an indication 406 of other users that are currently editing the document 102. In certain implementations, the edit tab 404 includes a control that allows a user to input a comment that is to be attached to the document 102. The edit tab 404 includes a document presentation and editing area 408. The area 408 presents the document 102 and allows the user to make changes to the document 102. The area 408 presents changes made by other users as they are merged with the document 102.

If a change conflict is determined, then the browser-based application 402 presents a notification 410 of the change conflict. The notification 410 or the user interface includes controls 412 and 414 that allow a user to retrieve and save, respectively, the content of the conflicting change.

Processes 500 and 600 will be described below in reference to FIGS. 5 and 6. The processes may be performed, for example, by a system such as the system 100 and a user interface such as the user interface 400. For clarity of presentation, the description that follows uses the system 100 and the user interface 400 as the basis of an example for describing the processes 500 and 600. However, another system, user interface, or combination of systems and/or user interfaces, may be used to perform the processes 500 and 600.

Figure 5:
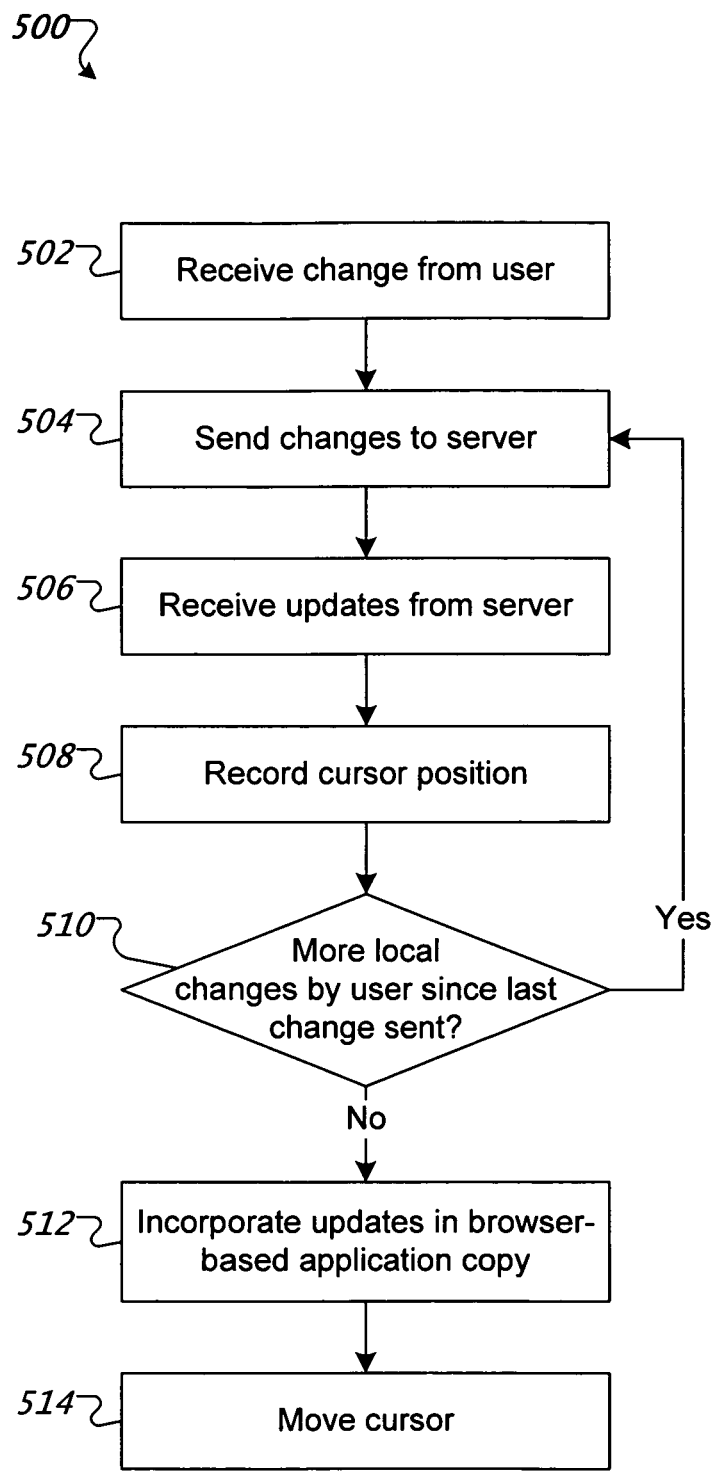
FIG. 5 is a flow chart showing an example of a process for updating a user interface with changes made to a shared document.

FIG. 5 is a flow chart showing an example of the process 500 for updating a user interface with changes made to a shared document. The process 500 begins with receiving (502) one or more changes to a document. For example, a user may make an input using the browser-based application 402 to modify the document 102, such as by adding text.

The process 500 sends (504) the changes to a server. For example, the browser-based application 402 may periodically send user changes to the server 104 or the user may manually request changes be sent to the server 104, such as by selecting a refresh or update control.

The process 500 receives (506) updates from the server. For example, after accepting changes from the user, the server 102 may return a new version of the document 102 including any changes made since the last version received from the browser-based application 402, or may simply return a delta update in reference to that last version. In addition, if the document sharing and editing application identified any conflicts, then the server 102 may send notifications to the browser-based application 402 indicating the conflicts and the changes that were not made.

The process 500 records (508) a cursor position. The cursor position indicates the current location where the user is editing the document. For example, the browser-based application 402 may record the number of HTML tags, and the types of the tags that are traversed in order to reach the current position of the cursor. The number of characters traversed within the text of the tag containing the cursor may also be recorded. The cursor position may be recorded in the form of a path through the document to the cursor position. The path to the cursor may be recorded from the beginning of the document (e.g., the "left") and/or the end of the document (e.g., the "right"). If a selection is in effect, a path may be recorded to the beginning and the end of the selection, and the fact of the selection may also be recorded. The path to the each of the beginning and ending of the selection may be recorded from the left and/or the right. In each case, the path may include the kinds of tags that are traversed and the content of any text that is traversed.

If the user has made more changes (510) to the document since the changes that are the basis for the update received from the server (in action 506), then the process 500 sends (504) the changes to the server. For example, if the user is currently editing a portion of the document 102 that is modified in the updates received from the server 102, then the browser-based application 402 may wait to present the updates until the user is done editing the updated portion. Otherwise, if the are no more changes, i.e., if the local version of the document is the same as the version on which the update is based, then the process 500 incorporates the update into the local copy of the document and presents (512) the updated document to the user for viewing and further editing. In certain implementations, the browser-based application 402 receives an entire version of the document 102 from the server 104 to present to the user. Alternatively, the browser-based application 402 may receive changes to be made to the presented document in order to match the current version of the document 102 at the server 104.

Having updated the presentation, the process 500 moves (514) the cursor to its previous position. For example, the browser-based application 402 uses the recorded cursor position to place the cursor at the location where the user was editing the document 102 before the updates were presented. If the number or type of HTML tags before (e.g., to the left of) the current location of the cursor have changed as a result of the presented updates, then the browser-based application 402 may use the path from the end (e.g., right) of the document 102. Additionally, if the cursor location includes a selection, then the browser-based application 402 may attempt to locate the position of the beginning or ending of the selection, each from either the left or right of the document 102. The browser-based application 402 uses the located position to reinsert the cursor and any selection into the document 102. In certain implementations, if the recorded paths to the cursor no longer match the updated document as a result of the updates to the document 102, then the browser-based application 402 may use a portion of the path to locate the cursor position. In certain implementations, if the browser-based application 402 does not locate a position, then the cursor is placed at the top of the document 102.

Figure 6:
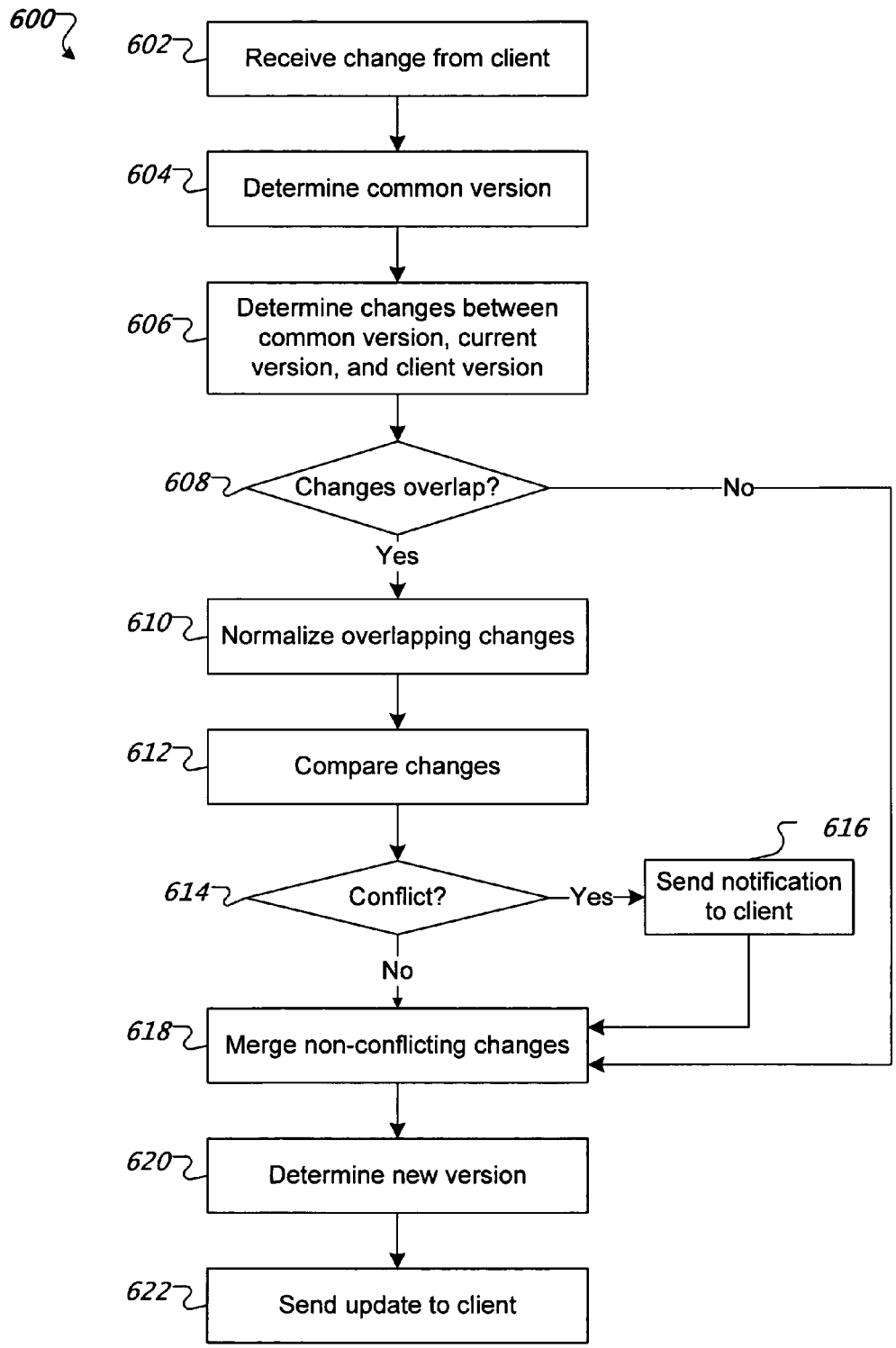
FIG. 6 is a flow chart showing an example of a process for merging changes to a shared document and sending updates to a computer.

FIG. 6 is a flow chart showing an example of the process 600 in a server for merging changes to a shared document and sending updates to a client. The process 600 receives (602) one or more changes to a document from one or more clients. For example, the document sharing and editing application 106 may receive a change from the browser-based application 114*a* at one computer 110*a* and a change from the browser-based application 114*b* at another computer 110*b*.

The process 600 determines (604) a common version between a current version of the document and a version of the document used by the changes. For example, the change from the browser-based application 114*a* may be made to a first version of the document 102, while the current version of the document 102 at the server 104 is a second version as a result of a change received from the browser-based application 114*b*. In this example, the common version is the first version.

The process 600 determines (606) changes between the common version and the current version, and changes between the common version and the version of the received changes. If a change resulting from the current version overlaps (608) with a change resulting from the received change (e.g., the changes include portions in common from the document), then the process 600 normalizes (610) the overlapping changes. Normalizing refers to formatting the language used to represent the document in a canonical style. For example, in the case of HTML, tag names and attribute names making up a document may use either upper case letters or lower case letters without changing the outward appearance of the document. Attributes may occur in a particular tag in any order without changing the outward appear of the document. Attribute values may or may not be enclosed in quotes and the quotes may be single or double. Whitespace between tags, such as tabs, spaces, and newlines, may change without affecting the outward appearance of the document. Normalization applies a set of rules to the components of the document so that differences that do not affect the appearance of the document are not identified as changes. For example, the document sharing and editing application 106 may convert tag and attribute names to lower case, list attributes in alphabetical order, enforce quotes around attribute values, and remove extra whitespace.

The process 600 compares (612) the changes between the common version and the current version to the changes between the common version and the version of the received changes. If a conflict exists (614), then the process 600 sends (616) a notification of the conflict to the client. The process 600 merges (618) changes that do not conflict into the document. For example, the document sharing and editing application 106 merges the change 302*a* into the document 102.

The process 600 determines (620) a new version of the document. For example, the document sharing and editing application 106 may increment the current version of the document 102.

The process 600 sends (622) an update to the computer including the new version number and content of the changes. For example, the document sharing and editing application 106 may send an update to the browser-based application 402 including a new version identifier, the document identifier, and the content of the changes to the previous version of the document 102.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results.

What is claimed is:

1. A computer-implemented method, comprising: receiving, at a server, a first user's changes to a first instance of a document the first user is editing on a first client and a second user's changes to a second instance of the document the second user is editing on a second client, the first instance of the document and the second instance of the document being concurrently open for editing;

updating, at the server, a server instance of the document to reflect one or more of the first user's changes;

then determining, at the server, that at least one of the second user's changes to the second instance of the document conflicts with the server instance of the document that was updated to reflect one or more of the first user's changes;

then updating, at the server, the server instance of the document to reflect the second user's changes that do not conflict with the server instance;

providing, to the second client, the server instance of the document reflecting the first user's changes and the second user's changes that do not conflict with the server instance that was updated to reflect the one or more of the first user's changes; and while the second instance of the document is still open for editing, notifying the second user of the at least one of the second user's changes to the second instance of the document that conflicted with the server instance of the document that was updated to reflect the first user's change and that is not reflected in the updated server instance of the document.

2. The method of claim 1, further comprising:

providing an option for the second user to retrieve the at least one of the second user's changes to the second instance of the document that conflicted with the server instance of the document that was updated to reflect the first user's changes and that is not reflected in the update server instance of the document.

3. The method of claim 1, further comprising:

merging the first user's and the second user's changes within the document if the first user's and the second user's changes do not conflict; and presenting the first user and the second user the merged document containing both the first user's and the second user's changes.

4. The method of claim 1, further comprising:

receiving input from the first user to create the document; and receiving input from the first user to authorize the second user to edit the document.

5. The method of claim 4, further comprising:

notifying the second user of an authorization to edit the document from the first user.

6. The method of claim 1, further comprising:

receiving the first user's changes and the second user's changes within the document, including receiving a respective document identification and a respective version identifier with the first user's changes and the second user's changes respectively.

7. The method of claim 1, further comprising:

informing the first user of an act of the second user's concurrent editing.

8. The method of claim 1, further comprising:

receiving input from the first user to add a comment to the document and attaching the comment to the document.

9. The method of claim 1, further comprising:

storing the document in the server, wherein the first user and the second user edit the document with browser-based applications.

10. A system comprising:

one or more computers configured to perform operations comprising:

receiving, at a server, a first user's changes to a first instance of a document the first user is editing on a first client and a second user's changes to a second instance of the document the second user is editing on a second client, the first instance of the document and the second instance of the document being concurrently open for editing;

updating, at the server, a server instance of the document to reflect one or more of the first user's changes;

then determining, at the server, that at least one of the second user's changes to the second instance of the document conflicts with the server instance of the document that was updated to reflect one or more of the first user's changes;

then updating, at the server, the server instance of the document to reflect the second user's changes that do not conflict with the server instance;

providing, to the second client, the server instance of the document reflecting the first user's changes and the second user's changes that do not conflict with the server instance that was updated to reflect the one or more of the first user's changes; and while the second instance of the document is still open for editing, notifying the second user of the at least one of the second user's changes to the second instance of the document that conflicted with the server instance of the document that was updated to reflect the first user's changes and that is not reflected in the updated server instance of the document.

11. The system of claim 10, the operations further comprising:

providing an option for the second user to retrieve the at least one of the second user's changes to the second instance of the document that conflicted with the server instance of the document that was updated to reflect the first user's changes and that is not reflected in the update server instance of the document.

12. The system of claim 10, the operations further comprising:

merging the first user's and the second user's changes within the document if the first user's and the second user's changes do not conflict; and presenting the first user and the second user the merged document containing both the first user's and the second user's changes.

13. The system of claim 10, the operations further comprising:

receiving input from the first user to create the document; and receiving input from the first user to authorize the second user to edit the document.

14. The system of claim 13, the operations further comprising:

notifying the second user of an authorization to edit the document from the first user.

15. The system of claim 10, the operations further comprising:

receiving the first user's changes and the second user's changes within the document, including receiving a respective document identification and a respective version identifier with the first user's changes and the second user's changes respectively.

16. The system of claim 10, the operations further comprising:

informing the first user of an act of the second user's concurrent editing.

17. The system of claim 10, the operations further comprising:

receiving input from the first user to add a comment to the document and attaching the comment to the document.

18. The system of claim 10, the operations further comprising:

storing the document in the server, wherein the first user and the second user edit the document using browser-based applications.

19. A non-transitory computer storage medium storing instructions that, when executed by a data processing apparatus, cause the data processing apparatus to perform operations comprising:

receiving, at a server, a first user's changes to a first instance of a document the first user is editing on a first client and a second user's changes to a second instance of the document the second user is editing on a second client, the first instance of the document and the second instance of the document being concurrently open for editing;

updating, at the server, a server instance of the document to reflect one or more of the first user's changes;

then determining, at the server, that at least one of the second user's changes to the second instance of the document conflicts with the server instance of the document that was updated to reflect one or more of the first user's changes;

then updating, at the server, the server instance of the document to reflect the second user's changes that do not conflict with the server instance;

providing, to the second client, the server instance of the document reflecting the first user's changes and the second user's changes that do not conflict with the server instance that was updated to reflect the one or more of the first user's changes; and while the second instance of the document is still open for editing, notifying the second user of the at least one of the second user's changes to the second instance of the document that conflicted with the server instance of the document that was updated to reflect the first user's changes and that is not reflected in the updated server instance of the document.

20. The non-transitory computer storage medium of claim 19, wherein the operations further comprise:

providing an option for the second user to retrieve the at least one of the second user's changes to the second instance of the document that conflicted with the server instance of the document that was updated to reflect the first user's changes and that is not reflected in the update server instance of the document.

21. The non-transitory computer storage medium of claim 19, wherein the operations further comprise:

merging the first user's and the second user's changes within the document if the first user's and the second user's changes do not conflict; and presenting the first user and the second user the merged document containing both the first user's and the second user's changes.

22. The non-transitory computer storage medium of claim 19, wherein the operations further comprise:

receiving input from the first user to create the document; and receiving input from the first user to authorize the second user to edit the document.

23. The non-transitory computer storage medium of claim 22, wherein the operations further comprise:

notifying the second user of an authorization to edit the document from the first user.

24. The non-transitory computer storage medium of claim 19, wherein the operations further comprise:

receiving the first user's changes and the second user's changes within the document, including receiving a respective document identification and a respective version identifier with the first user's changes and the second user's changes respectively.

25. The non-transitory computer storage medium of claim 19, wherein the operations further comprise:

informing the first user of an act of the second user's concurrent editing.

26. The non-transitory computer storage medium of claim 19, wherein the operations further comprise:

receiving input from the first user to add a comment to the document and attaching the comment to the document.

27. The non-transitory computer storage medium of claim 19, wherein the operations further comprise:

storing the document in the server, wherein the first user and the second user edit the document with browser-based applications.

\* \* \* \* \*